United States Patent
Schumacher

(10) Patent No.: US 10,057,749 B1
(45) Date of Patent: Aug. 21, 2018

(54) METHOD AND SYSTEM OF DETERMINING AN ACTUAL DISTRIBUTION AREA FOR AN ALERT

(71) Applicant: Sprint Spectrum L.P., Overland Park, KS (US)

(72) Inventor: Gregory D. Schumacher, Holliston, MA (US)

(73) Assignee: Sprint Spectrum L.P., Overland Park, KS (US)

( * ) Notice: Subject to any disclaimer, the term of this patent is extended or adjusted under 35 U.S.C. 154(b) by 621 days.

(21) Appl. No.: 14/085,078

(22) Filed: Nov. 20, 2013

(51) Int. Cl.
*H04M 11/04* (2006.01)
*H04W 4/90* (2018.01)
*H04W 4/22* (2009.01)

(52) U.S. Cl.
CPC ............. *H04W 4/90* (2018.02); *H04W 4/22* (2013.01)

(58) Field of Classification Search
CPC ............................... H04W 4/06; H04L 12/189
See application file for complete search history.

(56) References Cited

U.S. PATENT DOCUMENTS

| | | | |
|---|---|---|---|
| 6,745,021 B1 | 6/2004 | Stevens | |
| 8,054,772 B1 | 11/2011 | Upadhyay et al. | |
| 2004/0103158 A1* | 5/2004 | Vella et al. | 709/206 |
| 2009/0058665 A1 | 3/2009 | Lamb | |
| 2009/0070379 A1* | 3/2009 | Rappaport | 707/104.1 |
| 2009/0165065 A1 | 6/2009 | McClenny et al. | |
| 2009/0291630 A1* | 11/2009 | Dunn et al. | 455/3.01 |
| 2009/0325538 A1 | 12/2009 | Sennett et al. | |
| 2010/0142438 A1 | 6/2010 | Chen et al. | |
| 2011/0050461 A1* | 3/2011 | Pixley et al. | 340/933 |
| 2011/0081883 A1 | 4/2011 | Daly | |
| 2011/0081884 A1 | 4/2011 | Sennett et al. | |
| 2011/0230202 A1* | 9/2011 | Wood et al. | 455/456.1 |

OTHER PUBLICATIONS

Gunduzhan, Abstract: Enhanced GEO-targeting for CMAS (41st Conference on Broadcast Meteorology/Second Conference on Weather Warnings and Communication), 2013.

* cited by examiner

Primary Examiner — Khalid Shaheed
Assistant Examiner — K Wilford

(57) ABSTRACT

A computing system such as an alert originator may provide an interface through which a user (e.g., an employee of a public safety agency) may input a definition of a target area for distribution of a prospective alert. Upon receiving a target-area definition, the computing system may then request and receive a definition of an actual area in which the prospective alert would be distributed—which is composed of the coverage areas in which each participating wireless carrier networks would distribute the prospective alert. In turn, the computing system may present the user with a depiction of the actual distribution area for the prospective alert (e.g., an overlay of a geospatial shape on a map graphic), which enables the user to assess the actual distribution area and decide whether to refine the target geographic area for an alert before that alert is distributed.

20 Claims, 5 Drawing Sheets

METHOD AND SYSTEM OF DETERMINING AN ACTUAL DISTRIBUTION AREA FOR AN ALERT

BACKGROUND

Various systems exist for providing the public with alerts of information of interest, such as criminal activity (e.g., terrorist attack, child abduction, etc.), severe weather, natural disasters, and/or other events that have an impact on public safety. In the earlier days, these systems were typically designed to distribute alerts using broadcast media, such as television or radio. More recently, however, systems have been designed to distribute alerts to the public using wireless carrier networks. As one example, the Federal Communications Commissions (FCC) has established the Commercial Mobile Alert System (CMAS) (also known as the Wireless Emergency Alerts (WEA) system), which facilitates the distribution of emergency alerts by a wireless carrier to their subscribers in the event of national emergencies ("Presidential Alerts"), emergencies such as extreme weather where life or property is at risk ("Imminent Threat Alerts"), and/or emergencies involving missing or endangered children ("AMBER Alerts").

A typical wireless carrier network includes a number of base stations that radiate to define wireless coverage areas, such as cells and cell sectors, in which wireless communication devices (WCDs) can operate and engage in air-interface communication with the wireless carrier network. Each base station may then be coupled with equipment that provides connectivity with one or more transport networks, such as the public switched telephone network (PSTN) and/or the Internet for instance. Within this arrangement, a WCD operating in a coverage area of the wireless carrier network can thus engage in communication, via the wireless carrier network, with other WCDs operating in the wireless carrier and/or with various entities sitting outside the wireless carrier network, such as an alert provider.

OVERVIEW

Alert distribution systems such as CMAS/WEA enable public safety agencies or the like to distribute geographically-targeted alerts via wireless carrier networks to WCDs located in particular wireless coverage areas (e.g., cells and/or sectors). For instance, a public safety agency may initiate an alert message that requests distribution of an alert in a defined target area, such as a geocoded area or a polygon defined by a set of geographic coordinates. Upon receiving this alert message, each wireless carrier network participating in the alert distribution system may identify which of its coverage areas (e.g., cells and/or sectors) fall within the target distribution area—including those coverage areas that only partially fall within the target distribution area—and then broadcast the alert in the entirety of each such coverage area. Thus, the actual area in which the alert will be distributed in the alert distribution system (which is defined by the size and shape of the wireless carrier networks' coverage areas) is often larger than the target distribution area, which results in overalerting and degrades the accuracy of the alert distribution system.

One potential way to improve the accuracy of the alert distribution system is by having a public safety agency (or the like) adjust the target distribution area for an alert before that alert is distributed, so that the actual distribution area for the alert more closely matches the desired distribution area for the alert. However, until now, public safety agencies have been unable to obtain adequate information regarding the actual area in which a requested alert will be distributed, which deprives the public safety agency of any opportunity to adjust the target distribution area for an alert before it is distributed.

Disclosed herein are methods and systems that help to address this issue. According to the disclosed methods, a computing system such as an alert originator may provide an interface through which a user (e.g., an employee of a public safety agency) may input a definition of a target area for distribution of a prospective alert. Upon receiving a target-area definition, the computing system may then request and receive a definition of an actual area in which the prospective alert would be distributed in the alert system. In turn, the computing system may present the user with a depiction of the actual distribution area for the prospective alert (e.g., an overlay of a geospatial shape on a map graphic), which enables the user to assess the actual distribution area and decide whether to refine the target geographic area for an alert before that alert is distributed.

One embodiment of the disclosed methods may thus involve (a) receiving, into a computing system, a definition of a target area for distribution of a prospective alert in an alert system, (b) in response to receiving the definition of the target area, the computing system initiating a request for a definition of an actual area in which the prospective alert would be distributed in the alert system, (c) as a result of the initiating the request, the computing system receiving a definition of the actual area in which the prospective alert would be distributed, and (d) based on the received definition, the computing system presenting a depiction of the actual area in which the prospective alert would be distributed.

The received definition of the actual area in which the prospective alert would be distributed in the alert system may take various forms. In one example, the received definition may take the form of a single geographic definition of the actual area in which the prospective alert would be distributed. In another example, the received definition may take the form of a list of geographic definitions of the individual areas that constitute the actual area in which the prospective alert would be distributed, such as the respective areas in which the prospective alert would be distributed in the different wireless carrier networks of the alert system. According to this example, the disclosed method may further involve the computing system aggregating the geographic definitions of the individual areas into a single geographic definition of the actual area in which the prospective alert would be distributed. The received definition may take other forms as well.

The depiction of the actual area in which the prospective alert would be distributed may also take various forms. In a preferred implementation, this depiction will take the form of an overlay representing a geospatial shape on a map graphic. However, this depiction may take other forms as well.

In addition to presenting the depiction of the actual area in which the prospective alert would be distributed, the computing system may also present other information that helps a user decide whether to adjust the target distribution area. For example, the computing system may additionally present a depiction of the target area for distribution of the prospective alert, so that a user can easily compare the target and actual distribution areas for the prospective alert. As another example, the computing system may present additional information such as population density information, infrastructure information, and public safety risk information. Other examples are possible as well.

After presenting the depiction of the actual area in which the prospective alert would be distributed, the computing system may also receive additional input. For example, the computing system may receive a definition of an adjusted target area for distribution of the prospective alert. As another example, the computer system may receive a request to initiate an alert. Other examples are possible as well.

Another embodiment of the disclosed methods may involve (a) receiving, into a computing system, a request for a definition of an actual area in which a prospective alert would be distributed in an alert system, wherein the request includes a definition of a target area for distribution of the prospective alert in the alert system, (b) in response to receiving the request, the computing system sending the definition of the target area to one or more wireless carrier networks of the alert system, (c) as a result of sending the definition of the target area, the computing system receiving, from each of the one or more wireless carrier networks, a respective definition of a respective area in which the wireless carrier network would distribute the prospective alert, and (d) after receiving the respective definition from each of the one or more wireless carrier networks, the computing system responding to the request by sending a definition of an area that is composed of the respective area in which each of the one or more wireless carrier networks would distribute the prospective alert.

The definition of the area that is composed of the respective area in which each of the one or more wireless carrier networks would distribute the prospective alert may take various forms. In one example, this definition may comprise a single definition of the area composed of the respective area in which each of the one or more wireless carrier networks would distribute the prospective alert (which the computing system may compute by aggregating the respective definition received from each of the one or more wireless carrier networks). In another example, this definition may comprise the respective definition received from each of the one or more wireless carrier networks. Other examples are possible as well.

Also disclosed herein are network entities and computer-readable media configured to facilitate implementation of the disclosed methods.

These as well as other aspects and advantages will become apparent to those of ordinary skill in the art by reading the following detailed description, with reference where appropriate to the accompanying drawings.

DETAILED DESCRIPTION

Figure 1:
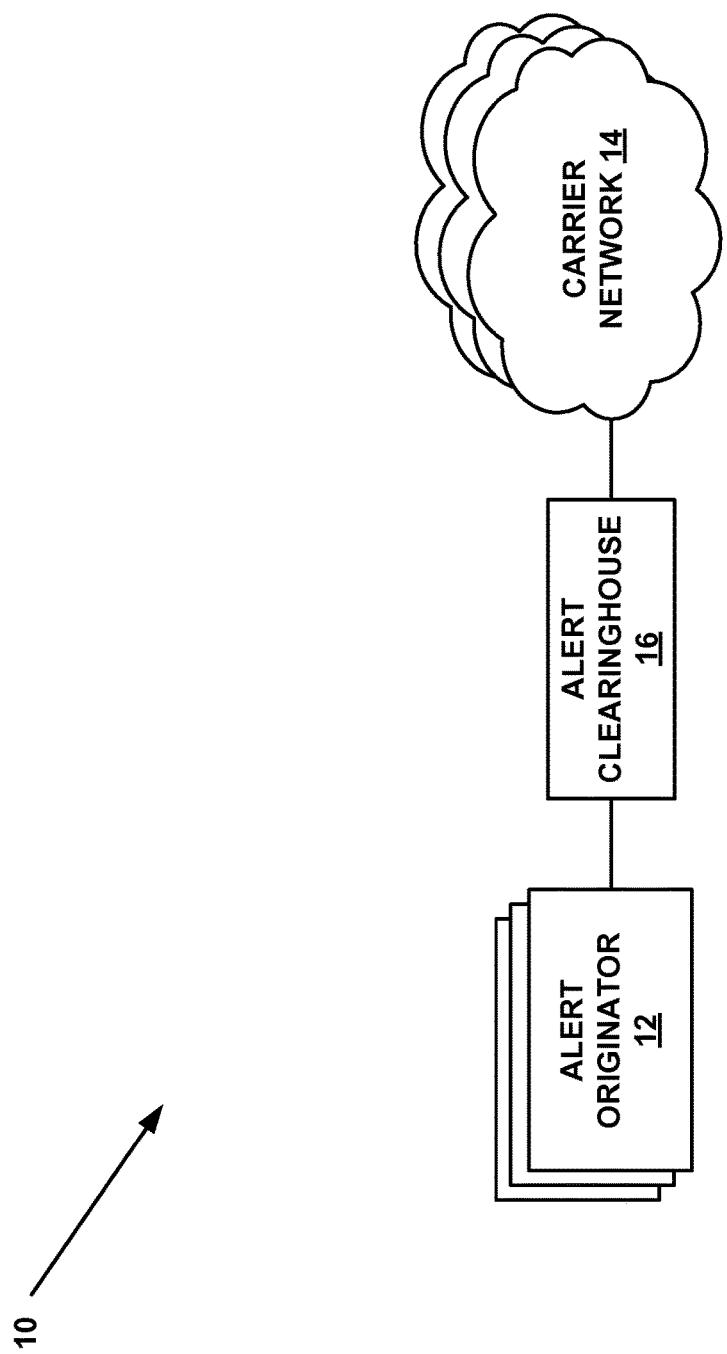
FIG. 1 is a simplified block diagram of an example communication system in which in which embodiments of the disclosed methods and entities can be implemented.

Referring to the drawings, FIG. 1 is a simplified block diagram of an example communication system 10 in which embodiments of the disclosed methods and entities can be implemented. It should be understood, however, that this and other arrangements described herein are set forth as examples only. As such, those skilled in the art will appreciate that other arrangements and elements (e.g., machines, interfaces, functions, orders of functions, etc.) can be used instead, some elements may be added, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware and/or software logic. For instance, various functions may be carried out by a processor executing instructions written in any suitable programming language and stored in memory.

FIG. 1 depicts example system 10 as including one or more alert originators, such as representative alert originator 12, that are communicatively with one or more wireless carrier networks, such as representative wireless carrier network 14, via an alert clearinghouse 16.

Representative alert originator 12 generally functions to originate messages that contain data defining an alert intended to notify people in a target geographic area of information of interest, such as criminal activity, severe weather, natural disasters, and/or other events that have an impact on public safety. In practice, alert originator 12 will typically be operated by a public safety agency, examples of which may include the Department of Homeland Security, the National Weather Service, the United States Geological Survey, the National Oceanic and Atmospheric Administration (NOAA), local law enforcement agencies, etc. However, alert originator 12 may be operated by some other qualified entity as well.

The alert messages originated by alert originator 12 may include various data that may enable a wireless carrier network to distribute the alert to people in a target geographic area. For example, an alert message may include a definition of the target area where the alert should be distributed, such as a geocode or a set of data defining a geospatial shape (e.g., a circle or polygon) for instance. As another example, an alert message may include various data about the information that is the subject of the alert, such as a textual description of the subject information, an indicator of the type, category, importance, severity, and/or urgency of the subject information, and/or a time associated with the subject information. As yet another example, an alert message may include various data about the message itself, such as an indicator of the type, sender, and/or intended recipients of the message. Other examples are possible as well. The alert messages originated by alert originator 12 may also be formatted according to any protocol now known or later developed, examples of which include Common Alerting Protocol (CAP), Specific Area Message Encoding (SAME), Atom Syndication Format (ATOM), and Short Message Service (SMS).

Alert originator 12 may take the form of any computer system that is arranged to carry out these functions. As one example, this computer system may comprise a client device running a native application for originating alert messages. As another example, this computer system may comprise a client device that is communicatively coupled to a server hosting a web application for originating alert messages. The computing system may take other forms as well.

Figure 2:
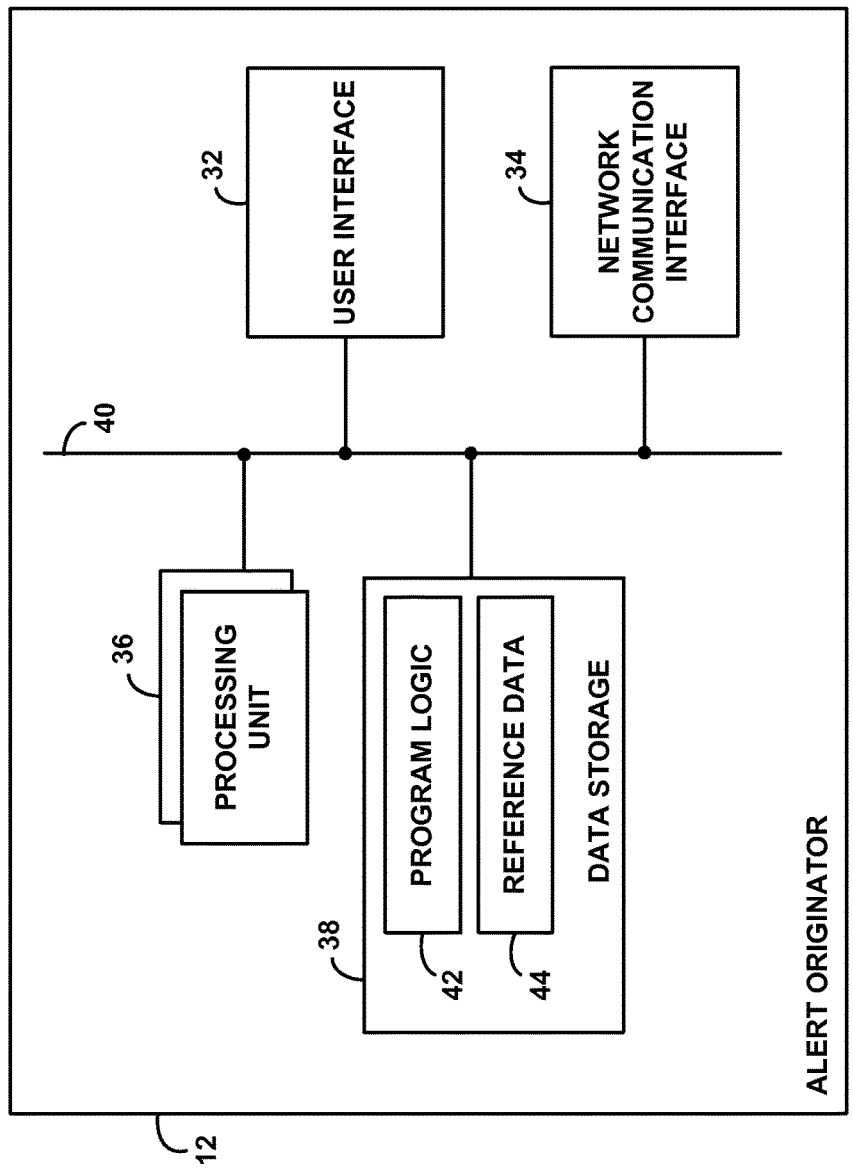
FIG. 2 is a simplified block diagram showing functional components that may be included in an example alert originator.

FIG. 2 is a simplified block diagram of representative alert originator 12, illustrating some of the components that may be included in such an entity. As shown by way of example in FIG. 2, representative alert originator 12 may include a user interface 32, a network communication interface 34, a processing unit 36, and non-transitory data storage 38, all of which may be communicatively linked together by a system bus, network, or other connection mechanism 40. While these components are shown in FIG. 2 as being part of a single physical entity, it should be understood that these components might be distributed across multiple entities, such as a client device and a server.

User interface 32 functions to facilitate interaction with a user of alert originator 12, such as an employee of a public safety agency, and may thus include and/or provide connectivity to various components that facilitate such user interaction. For instance, user interface 32 may include or provide connectivity to input components, examples of which include a keyboard or keypad, a mouse, a touch-sensitive screen or pad, a microphone, etc. Additionally, user interface 32 may include or provide connectivity to output components, examples of which include a display screen, a speaker, a headset jack, etc. Other configurations are possible as well.

Network communication interface 34 then generally functions to facilitate communication between alert originator 12 and alert clearinghouse 16 (and in turn, with wireless carrier networks such as representative wireless carrier network 14). As such, network communication interface 34 may take any suitable form for carrying out these functions, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 34 may also include multiple interfaces. Other configurations are possible as well.

Processing unit 36 may comprise one or more processor components, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), and/or any other processor components now known or later developed. Processing unit 36 may be integrated in whole or in part with other components of alert originator 12.

Non-transitory data storage 38 may then comprise one or more non-transitory computer readable storage mediums, such as volatile data storage mediums (e.g., random access memory (RAM), registers, and/or cache) and/or non-volatile data storage mediums (e.g., read only memory (ROM), a hard-disk drive, a solid-state drive, flash memory, and/or an optical-storage device). Data storage 38 may also be integrated in whole or in part with other components of alert originator 12.

As shown in FIG. 2, data storage 38 may be arranged to contain program logic 42 (e.g., machine language instructions or the like) that may be executable or interpretable by processing unit 36 to carry out various functions described herein, and this program logic 42 may take various forms. For instance, program logic 42 may define an application executable by processing unit 36 for originating alert messages based on user input. As noted above, in one example, this application may take the form of a native application running on a client device. And in another example, this application may take the form of a web application that is hosted on a server, in which case program logic 42 may additionally define a web browser application running on a client device that is capable of accessing the web application. Other examples are possible as well. Program logic 42 may take various other forms as well.

In practice, data storage 38 may at times also contain reference data 44 that is usable by processing unit 36 to carry out various functions described herein, and this reference data may take various forms. As one example, reference data 44 may include user input that is provided through the graphic user interface described above, such as information that defines a requested alert. As another example, reference data 44 may include information for presentation to a user, such as information related to alerts that have been originated by alert originator 12. Reference data 44 may take various other forms as well.

Figure 3:
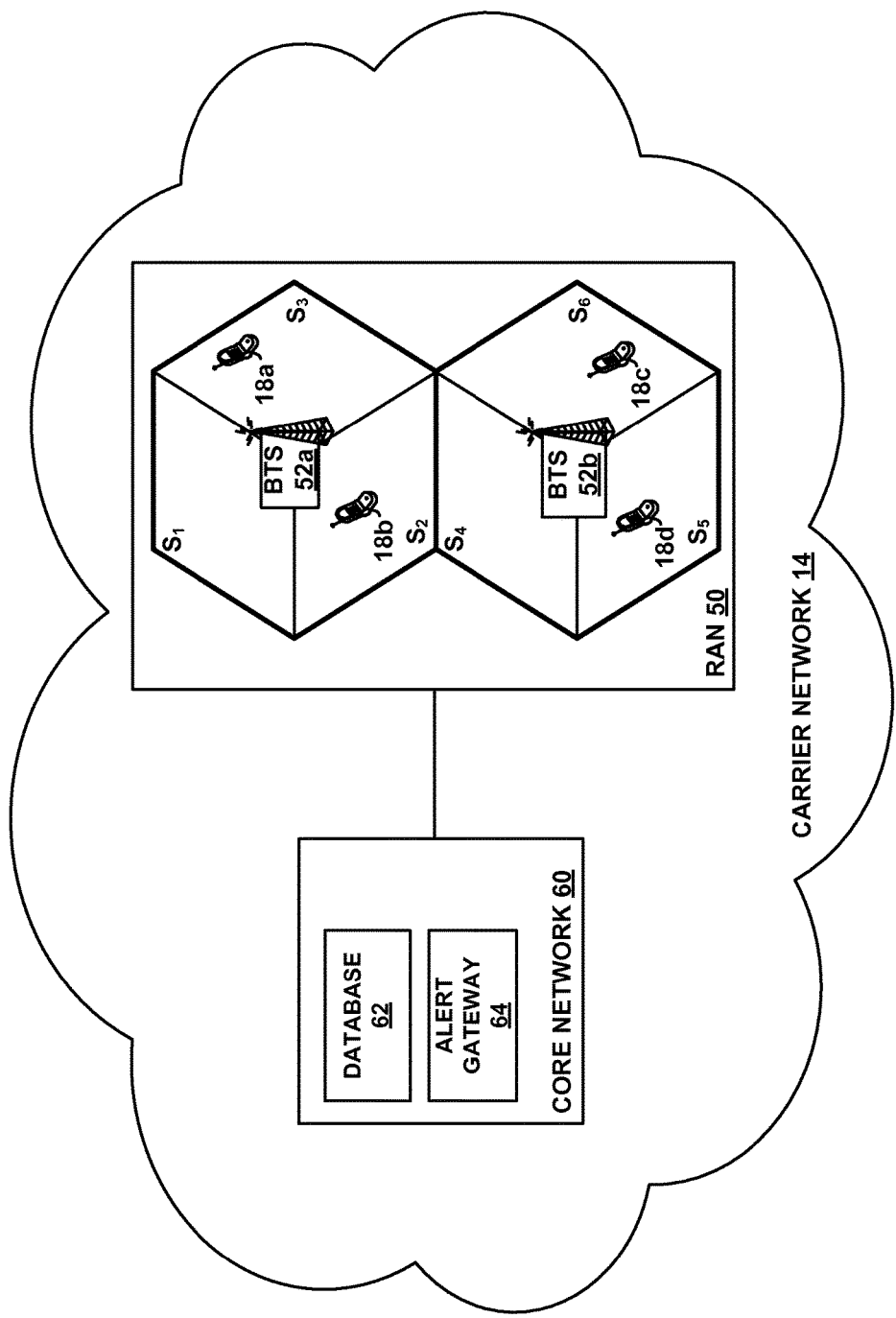
FIG. 3 is a simplified block diagram showing functional components that may be included in an example wireless carrier network.

Referring back to FIG. 1, representative wireless carrier network 14 may be any network that a wireless service provider operates to provide wireless services to subscribing wireless communication devices (WCDs) (e.g., cellular telephones, tablets or other wirelessly-equipped computers, mobile hotspots, etc.), such as representative WCDs 18a-d. Depending on the radio access technology employed and the wireless services provided, wireless carrier network 14 may take various different forms. FIG. 3 is a simplified block diagram of representative wireless carrier network 14, illustrating some of the entities that may be included in such a network. As shown by way of example in FIG. 3, representative wireless carrier network 14 may include one or more radio access networks (RANs), such as representative RAN 50, that are each communicatively coupled to a core network 60.

RAN 50 may include one or more base stations (e.g., base transceiver stations, access nodes, node-Bs, eNodeBs, etc.), each including an antenna an antenna system for emitting radio frequency (RF) radiation to define one or more coverage areas (e.g., a cell and/or cell sectors) in which the base station can engage in air-interface communication with WCDs. For example, FIG. 3 shows RAN 50 as including at least a first base station 52a that radiates to define representative cell sectors $S_1$-$S_3$ and a second base station 52b that radiates to define representative cell sectors $S_4$-$S_6$. It should be understood, however, that the depicted arrangement of base stations and coverage areas is for purposes of illustration only, and that numerous other arrangements of base stations and coverage areas are possible as well.

In practice, base stations such as base stations 52a-b and WCDs such as WCDs 18a-d may be arranged to operate and engage in air-interface communication according to a particular radio access technology or air-interface protocol, examples of which include Code Division Multiple Access (CDMA) (e.g., 1×EV-DO and 1×RTT), Long Term Evolution (LTE) (e.g., FDD LTE and TDD LTE), WiMAX, iDEN, TDMA, AMPS, Global System for Mobile Communications (GSM), GPRS, UMTS, EDGE, MMDS, WI-FI, and BLUETOOTH. Generally, the air-interface protocol may define a downlink (or forward link) for carrying communications from the base stations to WCDs and an uplink (or reverse link) for carrying communications from WCDs to the base stations. Further, the air-interface protocol may employ techniques such time division multiplexing, frequency-division multiplexing, and/or code-division multiplexing to divide the downlink and uplink into discrete resources (e.g., LTE resource blocks, 1×EV-DO timeslot resources, etc.), which may then be used to carry control and/or bearer data between the base station and particular WCDs.

Although not specifically shown, RAN 50 may further include one or more controllers that may provide connectivity to core network 60 and may also help to control aspects of the RAN's one or more base stations, such as aspects of antenna-system operation and/or air-interface communication. In one implementation, for instance, RAN 50 may include a separate controller (e.g., a base station controller or radio network controller) that sits between base stations 52*a-b* and core network 50. In another implementation, each of base stations 52*a-b* may include its own integrated controller. Other arrangements are possible as well, including arrangements in which at least a portion of the controller(s) resides in core network 60.

Core network 60 may then include network infrastructure (not shown) that provides connectivity between RAN 50 and one or more transport networks (e.g., the public switched telephone network (PSTN), the Internet, etc.) and may also help to control aspects of RAN 50 and its one or more base stations. Depending on the radio access technology employed, this network infrastructure may take various forms. For example, if wireless carrier network 14 is operating in accordance with an LTE protocol, core network 60 may include entities such as a mobility management entity (MME), a serving gateway (SGW), a packet data network gateway (PGW), and/or a home subscriber server (HSS). As another example, if wireless carrier network 14 is operating in accordance with a CDMA protocol, core network 60 may include entities such as a mobile switching center (MSC), a packet data serving node (PDSN), a home location register (HLR), and/or a visitor location register (VLR). The core network's infrastructure may take various other forms as well. (It should also be understood that at least some of these entities might be considered to be part of a network other than core network 60, such as RAN 50.)

As shown in FIG. 3, wireless carrier network 14 may also include a database 62 that contains data about the wireless carrier network's coverage areas. Database 62 may take the form of any server or other entity that is arranged to store this coverage-area data. For example, FIG. 3 shows database 62 as a separate entity that sits on (or is otherwise coupled to) core network 60. In an alternate example, however, one or more other network entities may be arranged to store coverage-area data for wireless carrier network 14 and thus serve as database 62. Other arrangements are possible as well.

The stored coverage-area data for wireless carrier network 14 may take various forms. As one example, the coverage-area data may include data identifying each coverage area of wireless carrier network 14, such as a cell ID, a sector ID, a carrier frequency, and/or pseudo-random noise offset for instance. As another example, the data identifying each coverage area may be correlated with data identifying particular network entities that serve the coverage area, such as an identifier of a serving base station and/or controller for instance. As yet another example, the coverage-area data may include a geographic definition of each coverage area, such as a set of geographic coordinates that define the coverage area's boundaries or a geographic coordinate of the coverage area's centroid and a distance of the coverage area's radius. Other examples are possible as well.

As further shown in FIG. 3, representative wireless carrier network 14 may include an alert gateway 64 that functions to process alert messages, such as alert messages generated by alert originator 12, and to facilitate distribution of these alert messages to WCDs operating in wireless carrier network 14. Alert gateway 64 may take the form of any server or other entity that is arranged to carry out these functions. For example, FIG. 3 shows alert gateway 64 as a separate server that sits on (or is otherwise coupled to) core network 60. In an alternate example, however, one or more other network entities may be arranged to carry out these functions and thus serve as alert gateway 64. One example of such an entity is a cell broadcast centre (CBC), which may be part of core network 60. Alert gateway 64 may take other forms as well.

To facilitate the processing and distribution of alerts, alert gateway 64 may also store and/or have access to preexisting data regarding known target areas for distribution alerts. This preexisting data may take various forms. As one possible example, the preexisting data may include a list of geocodes that are each keyed to a more detailed definition of the geocoded area, such as a set of data that defines the geographic boundaries of the geocoded area. Other examples are possible as well.

Referring again back to FIG. 1, alert clearinghouse 16 generally functions to provide an interface between the one or more alert originators in system 10, such as representative alert originator 12, and the one or more wireless carrier networks in system 10, such as representative wireless carrier network 14. For instance, alert clearinghouse 16 may receive alert messages from alert originators, perform any necessary processing on the received alert messages (and/or generate new alert messages based on the received alert messages), and then route the alert messages to one or more wireless carrier networks for distribution to WCDs. Alert clearinghouse 16 may perform other functions as well. Further, the path over which alert clearinghouse 16 communicates with the alert originators and wireless carrier network(s) in system 10 may take the form of any one or more transport networks (or the like) that facilitate such communication.

Figure 4:
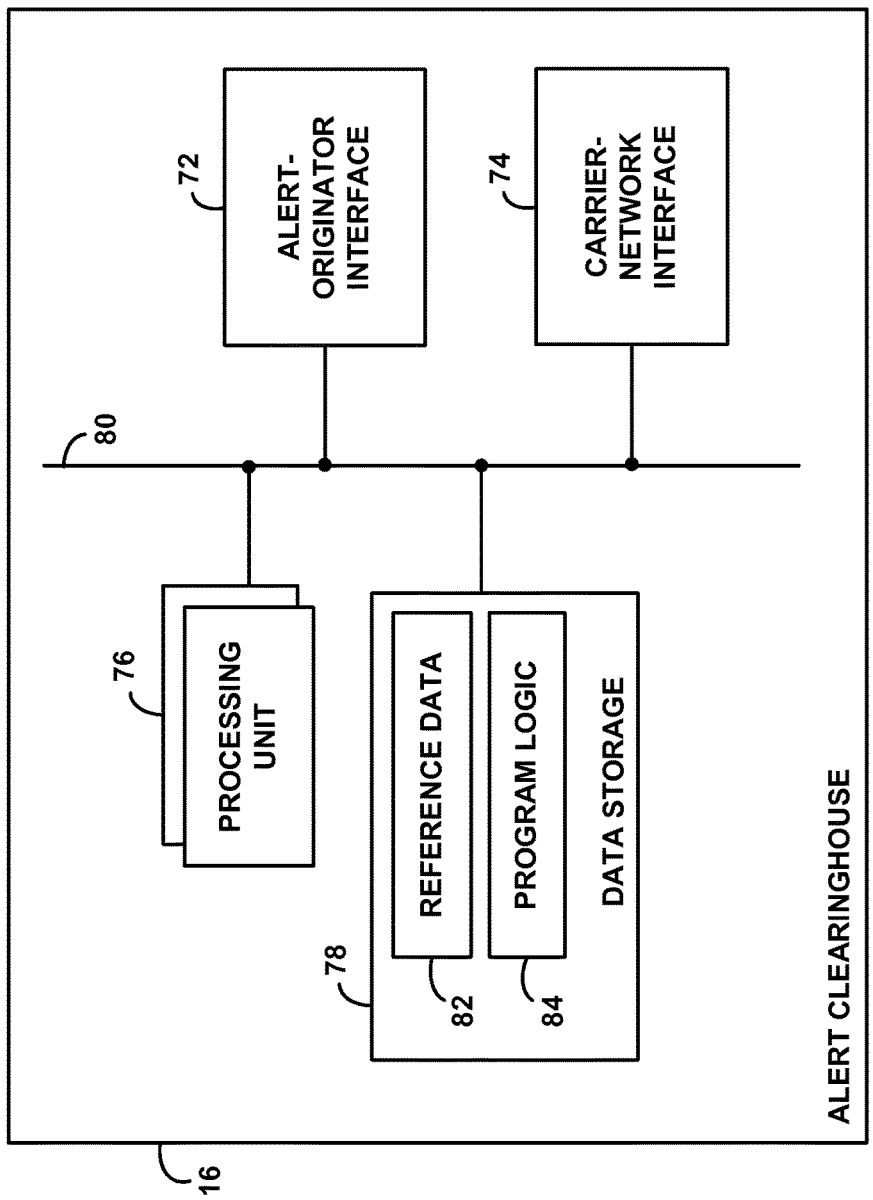
FIG. 4 is a simplified block diagram showing functional components that may be included in an example alert clearinghouse.

Alert clearinghouse 16 may take the form of any computer system that is arranged to carry out these functions. FIG. 4 is a simplified block diagram of representative alert clearinghouse 16, illustrating some of the components that may be included in such an entity. As shown by way of example in FIG. 4, representative alert clearinghouse 16 may include an alert-originator interface 72, a carrier-network interface 74, a processing unit 76, and non-transitory data storage 78, all of which may be communicatively linked together by a system bus, network, or other connection mechanism 80. While these components are shown in FIG. 4 as being part of a single physical entity, it should be understood that these components might be distributed across multiple entities.

Alert-originator interface 72 generally functions to facilitate communication between alert clearinghouse 16 and the one or more alert originators in system 10, such as representative alert originator 12. As such, alert-originator interface 72 may take any suitable form for carrying out this function, examples of which include an Ethernet interface, a serial bus interface (e.g., Firewire, USB 2.0, etc.), a chipset and antenna adapted to facilitate wireless communication, and/or any other interface that provides for wired and/or wireless communication. Alert-originator interface 72 may also include multiple communication interfaces (e.g., one interface for each respective alert originator). Other configurations are possible as well.

Carrier-network interface 74 then generally functions to facilitate communication between alert clearinghouse 16 and the one or more wireless carrier networks in system 10, such as representative wireless carrier network 14. As such, carrier-network interface 74 may take any suitable form for carrying out this function, examples of which include an Ethernet interface, a serial bus interface (e.g., Firewire, USB 2.0, etc.), a chipset and antenna adapted to facilitate wireless communication, and/or any other interface that provides for wired and/or wireless communication. Carrier-network interface 74 may also include multiple communication interfaces (e.g., one interface for each respective wireless carrier network). Other configurations are possible as well.

Processing unit 76 may comprise one or more processor components, such as general-purpose processors (e.g., a microprocessor), special-purpose processors (e.g., an ASIC or DSP), programmable-logic devices (e.g., a FPGA), and/or any other processor components now known or later developed. Processing unit 76 may be integrated in whole or in part with other components of alert clearinghouse 16.

Non-transitory data storage 78 may then comprise one or more non-transitory computer readable storage mediums, such as volatile data storage mediums (e.g., RAM, registers, and/or cache) and/or non-volatile data storage mediums (e.g., ROM, a hard-disk drive, a solid-state drive, flash memory, and/or an optical-storage device). Data storage 78 may also be integrated in whole or in part with other components of alert clearinghouse 16.

As shown in FIG. 4, data storage 78 may be arranged to contain program logic 82 (e.g., machine language instructions or the like) that may be executable or interpretable by processing unit 76 to carry out various functions described herein, and this program logic 82 may take various forms. In turn, data storage 78 may at times also contain reference data 84 that is usable by processing unit 76 to carry out various functions described herein, and this reference data may take various forms.

Figure 5:
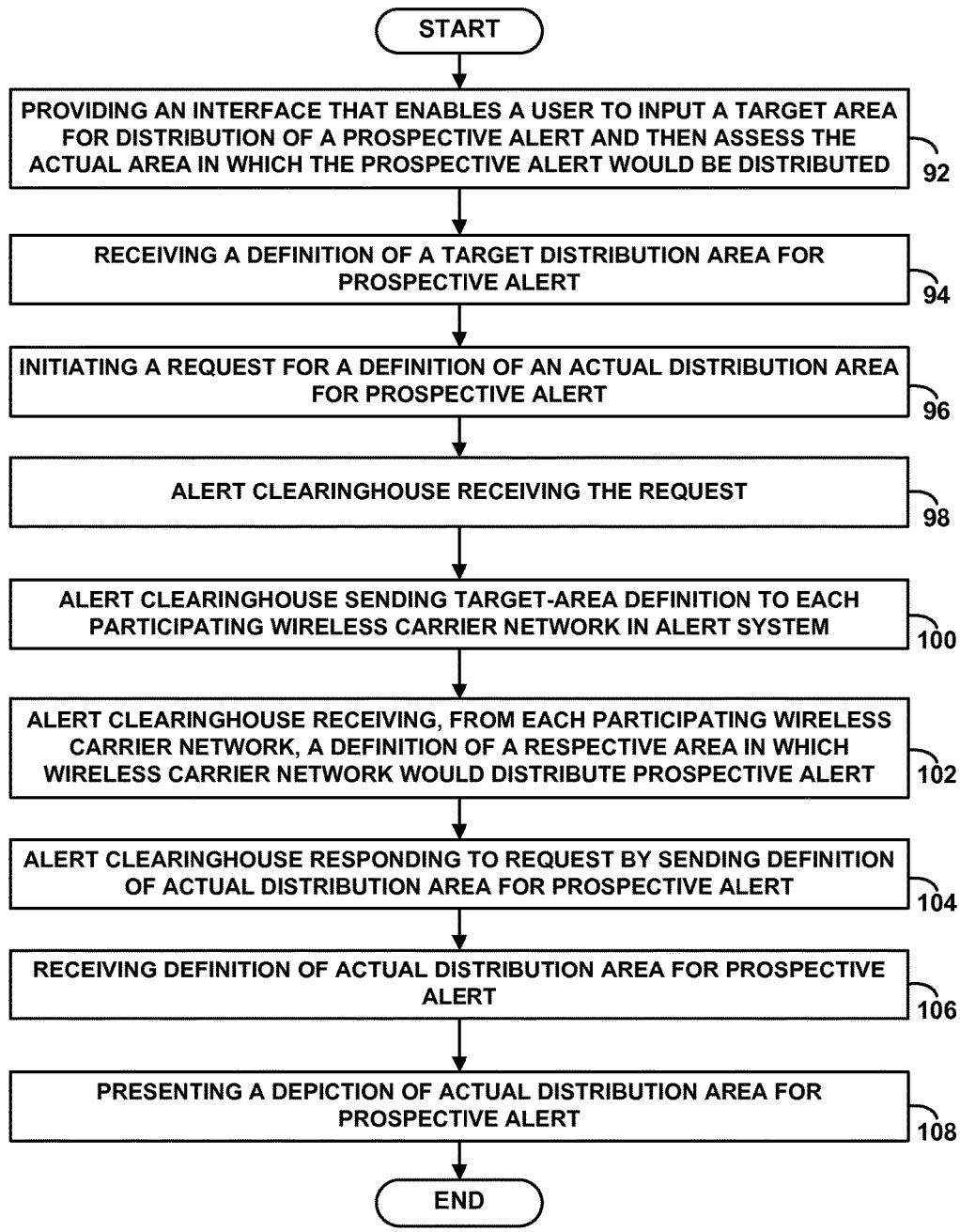
FIG. 5 is a flow chart depicting functions that can be carried out in accordance with an example embodiment of the disclosed methods.

Turning next to FIG. 5, a flow chart is shown to illustrate functions that can be carried out in accordance with an example embodiment of the disclosed methods. For purposes of illustration only, these functions will be described with reference to example system 10.

As shown in FIG. 5, the example embodiment may begin at step 92 with alert originator 12 providing an interface that enables a user (e.g., an employee of a public safety agency) to input a target area for distribution of a prospective alert and then assess the actual area in which the prospective alert would be distributed. In a preferred implementation, this interface will be associated with an application running on alert originator 12, which may take various forms. As one example, the application for originating alerts described above may be modified to include the functionality for assessing the actual distribution area of prospective alerts. As another example, alert originator 12 may include a separate application for assessing the actual distribution area of prospective alerts that compliments the application for originating alerts. In this example, the separate application for assessing the actual distribution area may be a native application running on a client device, a web application that is hosted on a server and accessible by a web browser application running on a client device, or any other type of application now known or later developed. The application may take other forms as well. (It should also be understood that the interface could be provided by an entity that is not technically an alert originator, such as another computing system operated by a public safety agency that is used to define and validate target distribution areas but not to actually originate alerts.)

Further, in a preferred implementation, the interface for assessing the actual distribution area of prospective alerts will include a graphical user interface (e.g., presented on a display of user interface 34) through which a user may input a definition of a target distribution area for a prospective alert and then receive information regarding the actual distribution area for the prospective alert. This graphical user interface may include various components that facilitate this user interaction. For instance, the graphical user interface may include input components that enable a user to input a definition of a target distribution area for a prospective alert, such as text boxes, buttons, lists, tools for drawing an overlay representing a geospatial shape (e.g., a polygon or circle) on a map graphic, etc. Additionally, the graphical user interface may include output components that present a user with information regarding the target distribution area and/or actual distribution area for a prospective alert, such as display text, map graphics with overlays, etc. The graphical user interface may include various other components as well.

At step 94, alert originator 12 may then receive a definition of a target distribution area for a prospective alert (e.g., via the graphical user interface). This target-area definition may take various forms. As one example, the target-area definition may include a geocode, such as a state/county code or a zip code. As another example, the target-area definition may include a set of data that defines a geospatial shape, such as a set of geographic coordinates that defines a polygon or a geographic coordinate and corresponding radius that define a circle. The target-area definition may take other forms as well.

Together with the target-area definition, alert originator 12 may also receive preliminary information about the prospective alert, such as the type, category, importance, severity, and/or urgency of the prospective alert. Alert originator 12 may receive other information regarding the prospective alert as well.

At step 96, in response to receiving the target-area definition, alert originator 12 may then initiate a request for a definition of an actual distribution area for the prospective alert. In a preferred implementation, alert originator 12 will send this request to alert clearinghouse 16. (It should be understood, however, that alert originator 12 may alternatively send this request directly to the wireless carrier network(s) of system 10, or to other entities in system 10).

The alert originator's request for a definition of the actual distribution area for the prospective alert may take various forms, examples of which include a modified version of an existing alert message and a new message type that is configured for the specific purpose of requesting the actual distribution area for a prospective alert. Further, the alert originator's request may include information that enables alert clearinghouse 16 and/or the wireless carrier network(s) in system 10 to determine the actual distribution area for the prospective alert. For instance, at a minimum, the request will preferably include the target-area definition received by alert originator 12. Additionally, the request may include preliminary information about the prospective alert, such as the preliminary information noted above. Additionally yet, the request may include header information such as the type, sender, and/or intended recipients of the request. The request may include other information as well. The request may also be formatted according to any protocol now known or later developed, examples of which include those described above in connection with the alert messages originated by alert originator 12.

At step 98, alert clearinghouse 16 may receive the request from alert originator 12. In turn, alert clearinghouse 16 may interface with the one or more wireless carrier networks in system 10 to determine the actual distribution area for the prospective alert. (As noted above, in an alternate implementation, alert originator 12 may interface directly with the one or more carrier networks in system 10, in which case alert originator 12 would take the place of alert clearinghouse 16 with respect to the functions described below. Further, in another alternate implementation, alert clearinghouse 16 may maintain sufficient information about the wireless carrier networks' coverage areas such that it can determine the actual distribution area without communicating with the wireless carrier networks.) Alert clearinghouse 16 may carry out this function in various manners.

In one implementation, at step 100, alert clearinghouse 16 may send the target-area definition to each wireless carrier network in system 10 that has elected to participate in alert distribution services, an example of which may include wireless carrier network 14. In response to receiving the target-area definition, wireless carrier network 14 may then identify which of its coverage areas fall within the target distribution area, as these coverage areas collectively make up the actual area in which wireless carrier network 14 would distribute the prospective alert.

Wireless carrier network 14—and in particular alert gateway 64—may carry out this identification using any technique now known or later developed. As one example, alert gateway 64 may identify the coverage areas falling within the target distribution area by comparing the target-area definition to geographic definitions for the wireless carrier network's coverage areas (e.g., by executing a mapping application that overlaps a map of the target distribution area with a map of the coverage areas and/or executing a mathematical algorithm that takes the geographic definitions as its inputs). As another example, alert gateway 64 may identify the coverage areas falling within the target distribution area based on preexisting data that identifies the coverage areas falling within certain known target areas, which may be stored at alert gateway 64 and/or some other network entity that is accessible by alert gateway 64 (e.g., database 62). Other examples are possible as well.

In a typical implementation, alert gateway 64 will be configured to identify any coverage area that is either fully or partially encompassed by the target distribution area. However, it should be understood that alert gateway 64 may alternatively be configured to employ some other criteria for identifying the coverage areas that fall within the target distribution area (e.g., only those coverage areas that are fully encompassed by the target distribution area).

As part of identifying the coverage areas that fall within the target distribution area, alert gateway 64 may also obtain the geographic definitions for the identified coverage areas (e.g., by retrieving such information from database 62), which collectively define the actual area in which wireless carrier network 14 would distribute the prospective alert. Alert gateway 64 may then use these geographic definitions to provide alert clearinghouse 16 with a definition of the actual area in which wireless carrier network 14 would distribute the prospective alert. For example, alert gateway 64 may simply send alert clearinghouse 16 a list of the geographic definitions for the identified coverage areas. As another example, alert gateway 64 may first aggregate the geographic definitions for the identified coverage areas into a single geographic definition for the collective area spanned by the identified coverage areas (e.g., a set of data defining a geospatial shape that represents the collective area's geographic boundaries), and alert gateway 64 may then send this single definition to alert clearinghouse 16. Other examples are possible as well.

At step 102, alert clearinghouse 16 may then receive, from each participating wireless carrier network, a definition of a respective area in which the wireless carrier network would distribute the prospective alert. This definition may take various forms. In one implementation, for instance, the definition may take the form of a single geographic definition of the collective area spanned by the coverage areas in which the wireless carrier network would distribute the prospective alert. In another implementation, the definition may include a list of geographic definitions for the individual coverage areas in which the wireless carrier network would distribute the prospective alert. Other implementations are possible as well. (It should also be understood that in some implementations, a given wireless service provider may operate multiple overlapping wireless carrier networks and may only send one definition for the actual distribution area in the service provider's multiple carrier networks, as opposed to a respective definition for each carrier network.) Upon receiving this definition from each participating wireless carrier network, alert clearinghouse 16 may store the definition along with an identifier of the wireless carrier network.

After receiving the definitions from the participating wireless carrier networks, alert clearinghouse 16 may optionally perform aggregation operations on these definitions. For example, if alert clearinghouse 16 receives a definition from a wireless carrier network that takes the form of a list of geographic definitions for individual coverage areas that constitute the actual area in which the wireless carrier network would distribute the prospective alert, alert clearinghouse 16 may aggregate these geographic definitions into a single geographic definition for the collective area spanned by the individual coverage areas. As another example, alert clearinghouse 16 may aggregate the respective definitions received from the different wireless carrier networks into one single definition of the actual area in which the prospective alert would be distributed in system 10 as a whole. Alert clearinghouse 16 may perform other aggregation operations as well.

At step 104, alert clearinghouse 16 may then respond to alert originator's request by sending back a definition of the actual distribution area for the prospective alert. In line with the discussion above, this definition may take various forms. In one implementation, for instance, the definition may take the form of a single geographic definition of the actual area in which the prospective alert would be distributed in system 10 as a whole. In another implementation, the definition may include a list of geographic definitions for individual areas that constitute the actual area in which the prospective alert would be distributed in system 10, such as the respective distribution areas for the different wireless carrier networks or even perhaps the respective coverage areas that constitute the respective distribution areas of the different wireless carrier networks. Other implementations are possible as well.

At step 106, alert originator 12 may receive the definition of the actual distribution area for the prospective alert. And depending on the form of this received definition, alert originator 12 may optionally perform aggregation operations on the received definition, such as aggregation options similar to those described above.

At step 108, alert originator 12 may then present the user with a depiction of the actual distribution area for the prospective alert (e.g., via the graphical user interface). This depiction may take various forms. In a preferred implementation, the depiction of the actual distribution area for the prospective alert may take the form of an overlay on a map graphic. For example, alert originator 12 may depict the actual distribution area for the prospective alert as an overlay representing a single geospatial shape on a map graphic. As another example, alert originator 12 may depict the actual distribution area as a plurality of overlays representing individual geospatial shapes on a map graphic that each correspond to a respective distribution area for a different wireless carrier network, in which case the different overlays may be labeled (e.g., using color coding or the like) to distinguish between them. The depiction of the actual distribution area may take other forms as well.

According to a preferred implementation, in addition to presenting the depiction of the actual distribution area of the prospective alert, alert originator 12 may also present the user with a depiction of the target distribution area for the prospective alert, so that the user can easily compare the actual distribution area to the target distribution area. As with the depiction of the actual distribution area, the depiction of the target distribution area will preferably take the form of an overlay representing a geospatial shape on a map graphic. In this respect, the graphical user interface provided by alert originator 12 may include a single interface component that (a) allows a user to input a definition of the target distribution area by drawing an overlay representing a geospatial shape on a map graphic and then (b) continues to display the drawn overlay on the map graphic so as to present a depiction of the target distribution area. However, the depiction of the target distribution area may take other forms as well.

Alert originator 12 may also present the user with other information that may help the user visualize the actual distribution area of the prospective alert and its impact on system 10. For example, alert originator 12 may additionally depict population density information on the map graphic. As another example, alert originator 12 may depict infrastructure information on the map graphic, such as information concerning transportation stations, rail lines, evacuation routes, etc. As yet another example, alert originator 12 may depict public safety risk information on the map graphic, such as identifications of areas that present an increased safety risk (e.g., areas with geographic features that present a flood risk). Other examples are possible as well.

In some implementations, alert originator 12 may also provide the user with options for customizing the information that is presented and the manner in which that information is displayed. For example, the user may be provided with the capability of switching between different types of map graphics (e.g., population density maps, infrastructure maps, etc.), toggling certain information on or off, zooming in or out on certain portions of the displayed map graphic, etc. Alert originator 12 may provide the user with other display options as well, including any display options for mapping applications now known or later developed.

After alert originator 12 presents the user with a depiction of the actual distribution area for the prospective alert, the user may take various actions. As one example, after seeing the actual distribution area for the prospective alert, the user may decide to adjust the definition of the target distribution area before originating the alert (e.g., if the actual distribution area will be much larger than the desired distribution area). In this respect, the user may also input definition of the adjusted definition of the target distribution area into the interface for assessing the actual distribution area of a prospective alert (in which case the steps described above may be repeated), or the user may simply decide to originate the alert using the adjusted definition of the target distribution area without further analysis. As another example, after seeing the actual distribution area for the prospective alert, the user may decide to originate the alert using the original definition of the target distribution area. As yet another example, after seeing the actual distribution area for the prospective alert, the user may simply store the original and/or adjusted definition of the target distribution area for future reference. In this way, the application for assessing the actual distribution area of a prospective alert may serve as tool for defining and validating target distribution areas for future use. The user may take other actions after seeing the actual distribution area for the prospective alert as well.

While example embodiments have been described above, those skilled in the art will understand that changes and modifications may be made to these embodiments without departing from the true scope and spirit of the present invention, which is defined by the claims.

I claim:

1. A method comprising:
   receiving, into a computing system, a definition of a target area for distribution of a prospective alert in an alert system;
   in response to receiving the definition of the target area, the computing system initiating a request for a definition of an actual area in which the prospective alert would be distributed in the alert system;
   as a result of the initiating the request, the computing system receiving a definition of the actual area in which the prospective alert would be distributed, wherein the definition of the actual area in which the prospective alert would be distributed comprises a definition of geographic span of wireless coverage provided by one or more base stations that would distribute the prospective alert; and
   based on the received definition of the actual area in which the prospective alert would be distributed, the computing system presenting a depiction of the actual area in which the prospective alert would be distributed.

2. The method of claim 1, wherein the definition for the target area comprises a geocode or a set of data defining a geospatial shape.

3. The method of claim 1, further comprising:
   before receiving the definition of the target area, the computing system providing an interface for entering the definition of the target area.

4. The method of claim 1, wherein the request for a definition of the actual area in which the prospective alert would be distributed includes the definition of the target area.

5. The method of claim 1, wherein the received definition of the actual area in which the prospective alert would be distributed comprises a single geographic definition of the actual area in which the prospective alert would be distributed.

6. The method of claim 1, wherein the received definition of the actual area in which the prospective alert would be distributed comprises a list of geographic definitions of individual areas that constitute the actual area in which the prospective alert would be distributed.

7. The method of claim 6, wherein the individual areas that constitute the actual area in which the prospective alert would be distributed comprise a respective area in which the prospective alert would be distributed in each wireless carrier network of the alert system.

8. The method of claim 7, further comprising:
   after receiving the definition of the actual area in which the prospective alert would be distributed, the computing system aggregating the geographic definitions of the individual areas into a single geographic definition of the actual area in which the prospective alert would be distributed.

9. The method of claim 1, wherein the depiction of the actual area in which the prospective alert would be distributed comprises an overlay representing a geospatial shape on a map graphic.

10. The method of claim 1, further comprising:
in addition to presenting the depiction of the actual area in which the prospective alert would be distributed, the computing system presenting a depiction of the target area for distribution of the prospective alert.

11. The method of claim 10, wherein the depiction of the target area for distributing the prospective alert comprises an overlay representing a geospatial shape on a map graphic.

12. The method of claim 1, further comprising:
in addition to presenting the depiction of the actual area in which the prospective alert would be distributed, the computing system presenting one or more of population density information, infrastructure information, and public safety risk information.

13. The method of claim 1, further comprising:
after presenting the depiction of the actual area in which the prospective alert would be distributed, the computing system receiving a definition of an adjusted target area for distribution of the prospective alert.

14. The method of claim 1, wherein the computing system comprises an alert originator.

15. A method comprising:
receiving, into a computing system, a request for a definition of an actual area in which a prospective alert would be distributed in an alert system, wherein the request includes a definition of a target area for distribution of the prospective alert in the alert system;
in response to receiving the request, the computing system sending the definition of the target area to one or more wireless carrier networks of the alert system;
as a result of sending the definition of the target area, the computing system receiving, from each of the one or more wireless carrier networks, a respective definition of a respective area in which the wireless carrier network would distribute the prospective alert; and
after receiving the respective definition from each of the one or more wireless carrier networks, the computing system responding to the request by sending a definition of an area that is composed of the respective area in which each of the one or more wireless carrier networks would distribute the prospective alert, wherein the definition of the area that is composed of the respective area in which each of the one or more wireless carrier networks would distribute the prospective alert comprises a definition of geographic span of wireless coverage provided by one or more base stations that would distribute the prospective alert.

16. The method of claim 15, further comprising:
before responding to the request, the computing system aggregating the respective definition received from each of the one or more wireless carrier networks into a single definition of the area composed of the respective area in which each of the one or more wireless carrier networks would distribute the prospective alert.

17. The method of claim 16, wherein the definition of the area that is composed of the respective area in which each of the one or more wireless carrier networks would distribute the prospective alert comprises the single definition of the area composed of the respective area in which each of the one or more wireless carrier networks would distribute the prospective alert.

18. The method of claim 15, wherein the definition of the area that is composed of the respective area in which each of the one or more wireless carrier networks would distribute the prospective alert comprises the respective definition received from each of the one or more wireless carrier networks.

19. The method of claim 15, wherein the computing system comprises an alert clearinghouse.

20. A non-transitory computer readable medium having stored thereon instructions that are executable by a processing unit to carry out functions comprising:
receiving a definition of a target area for distribution of a prospective alert in an alert system;
in response to receiving the definition of the target area, initiating a request for a definition of an actual area in which the prospective alert would be distributed in the alert system;
as a result of the initiating the request, receiving a definition of the actual area in which the prospective alert would be distributed, wherein the definition of the actual area in which the prospective alert would be distributed comprises a definition of geographic span of wireless coverage provided by one or more base stations that would distribute the prospective alert; and
based on the received definition of the actual area in which the prospective alert would be distributed, presenting a depiction of the actual area in which the prospective alert would be distributed.

* * * * *